(12) United States Patent
Suzuki

(10) Patent No.: US 6,320,724 B1
(45) Date of Patent: Nov. 20, 2001

(54) FLOPPY DISK DRIVE UNIT WITH CONTACT PREVENTING MECHANISM

(75) Inventor: Shunichi Suzuki, Gunma (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/321,722

(22) Filed: May 28, 1999

(30) Foreign Application Priority Data

Jun. 9, 1998 (JP) .................................. 10-160327

(51) Int. Cl.[7] .................................................. G11B 17/04
(52) U.S. Cl. .............................................................. 360/99.2
(58) Field of Search ........................... 360/99.2, 99.1, 360/99.6, 99.7, 97.1, 97.4, 99.3; 369/199, 75.2, 77.1, 77.2

(56) References Cited

U.S. PATENT DOCUMENTS

| | | | |
|---|---|---|---|
| 5,187,622 | * 2/1993 | Watanabe | 360/99.2 |
| 5,521,899 | * 5/1996 | Taki | 369/244 |
| 5,537,271 | * 7/1996 | Kum et al. | 360/99.6 |
| 5,583,716 | * 12/1996 | Akiba et al. | 360/99.1 |
| 5,956,206 | * 9/1999 | Kabasawa et al. | 360/99.6 |
| 6,052,256 | * 4/2000 | Kawakami | 390/99.6 X |

* cited by examiner

*Primary Examiner*—William Klimowicz
*Assistant Examiner*—Tianjie Chen
(74) *Attorney, Agent, or Firm*—Young & Thompson (57) ABSTRACT

To provide a floppy disk drive unit in which a magnetic head is prevented from being broken. This floppy disk drive unit 1 includes an upper magnetic head 10a and a lower magnetic head 10b which have the respective sliding faces opposite to each other, a cassette support 4 for supporting a floppy disk 3 opposite to the magnetic heads 10a, 10b, and a contact preventing element 19 for preventing breakage of the magnetic head 10b. The contact preventing element 19 has a first stopper part 19b for inhibiting the downward movement of the cassette support 4 to prevent its contact with the magnetic head. By this arrangement, even if impact is applied from the outside to the floppy disk drive unit so that the cassette support 4 is bent and descended, the cassette support 4 is supported from below by the first stopper part 19b so as to prevent the magnetic head 10b from being damaged.

17 Claims, 6 Drawing Sheets

FLOPPY DISK DRIVE UNIT WITH CONTACT PREVENTING MECHANISM

BACKGROUND OF THE INVENTION

This invention relates to a floppy disk drive unit and particularly to the floppy disk drive unit in which a magnetic head is prevented from being broken.

A floppy disk drive unit for writing and reading data in a record medium of a floppy disk has been widely used. The conventional floppy disk drive unit will now be described.

The conventional floppy disk drive unit generally includes a magnetic head with the sliding face up, a support for supporting a floppy disk opposite to the magnetic head, and a housing for storing the magnetic head and the support.

The magnetic head part is, for example, formed by upper and lower magnetic heads respectively having sliding faces (medium opposite surface) opposite to each other.

The conventional floppy disk drive unit, however, has the problem that the support is deflected by external impact and the impact is applied to the sliding face to be broken. For example, in the floppy disk drive unit having an upper magnetic head and a lower magnetic head, the magnetic heads sometimes collide with each other to be broken.

SUMMARY OF THE INVENTION

In the light of such circumstances, the present invention has been proposed, and it is an object of the invention to provide a floppy disk drive unit in which a magnetic head is prevented from being broken.

The floppy disk drive unit of the invention is a floppy disk drive unit for reading and writing information in a floppy disk by a magnetic head, comprising: a magnetic head with the sliding face up; a support for supporting a floppy disk opposite to the magnetic head; a housing for storing the magnetic head and the support; and a contact preventing element having a first stopper part for inhibiting downward movement of the support to prevent its contact with the magnetic head and a second stopper part for inhibiting downward movement of a floppy disk to prevent its contact with the magnetic head.

In the floppy disk drive unit of the invention, the first stopper part is formed by a first projecting part formed on an extension part extended to the back part of the housing over the shutter edge position of a floppy disk supported on the support.

In the floppy disk drive unit of the invention, the second stopper part is a support surface for supporting the lower surface of a floppy disk.

The floppy disk drive unit of the invention further includes a slider adapted to slide, interlocking with insertion of the floppy disk, and an arm adapted to turn according to the sliding operation of the slider, wherein the contact preventing element is slid from the contact preventing position to the contact prevention releasing position on the inner surface of the housing, interlocking with the turning of the arm.

The floppy disk drive unit of the invention further includes a second projecting part provided in the interior of the housing, wherein the contact preventing element is put on the second projecting part in the contact preventing position, and departs from the projecting part in the contact prevention releasing position.

The floppy disk drive unit of the invention is so constructed that in inserting the floppy disk to be held, the support and the contact preventing element are interlocked with each other and descended.

The floppy disk drive unit of the invention may include a holder which is connected to the housing and energized downward to be pressed to the support, and a second magnetic head fitted to the lower surface of the holder with the sliding face down.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DESCRIPTION OF THE PREFERRED EMBODIMENTS

The preferred embodiments of the invention will now be cited in the followings and the invention will now be described concretely and more in detail with reference to the accompanying drawings.

Embodiments

Figure 1:
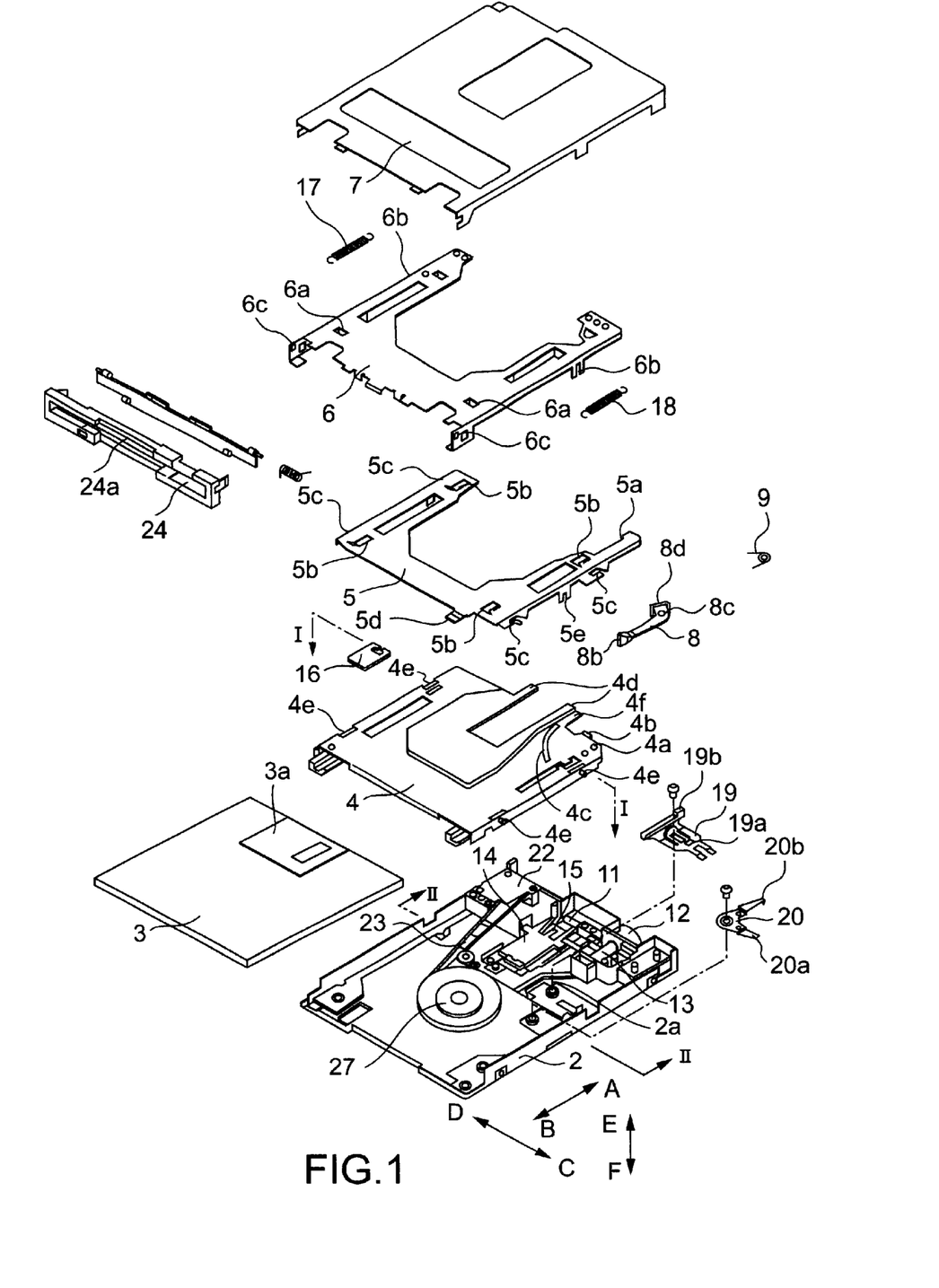
FIG. 1 is a development showing the construction of an embodiment of a floppy disk drive unit.

The present embodiment is one embodiment of the present invention. FIG. 1 is a development showing the construction of a floppy disk drive unit according to the present embodiment.

According to FIGS. 1 and 3B, the floppy disk drive unit of the present embodiment includes an upper magnetic head 10a and a lower magnetic head 10b having sliding faces opposite to each other, a cassette support 4 for supporting a floppy disk (magnetic disk cartridge medium) 3 opposite to the sliding faces of both magnetic heads, and a unit base 2 (hereinafter referred to as a base 2), which is a member for forming a housing, and has a projecting part 2a in the vicinity of the magnetic head 10b.

Figure 2A:
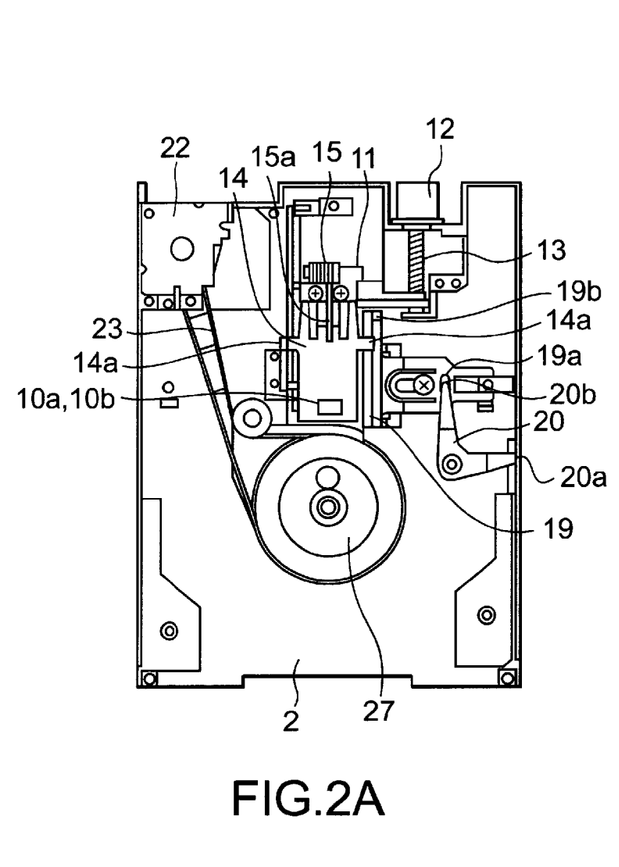
FIGS. 2A, 2B, and 2C are respectively a plan view of the embodiment taken in the direction of the arrow I—I in the condition where a floppy disk is not yet installed, a plan view of a cassette support; and a side view of the base.
Figure 2B:
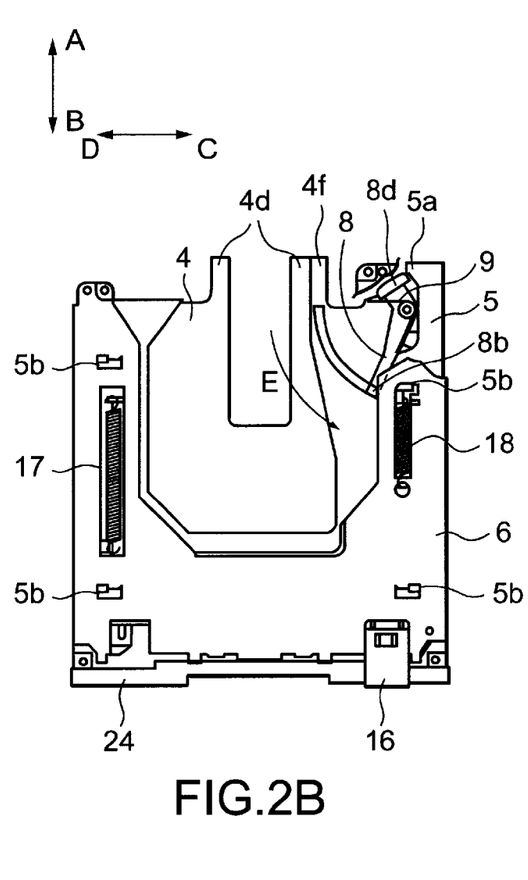
Figure 2C:
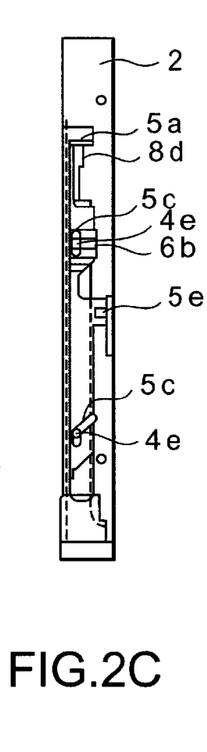
Figure 3A:
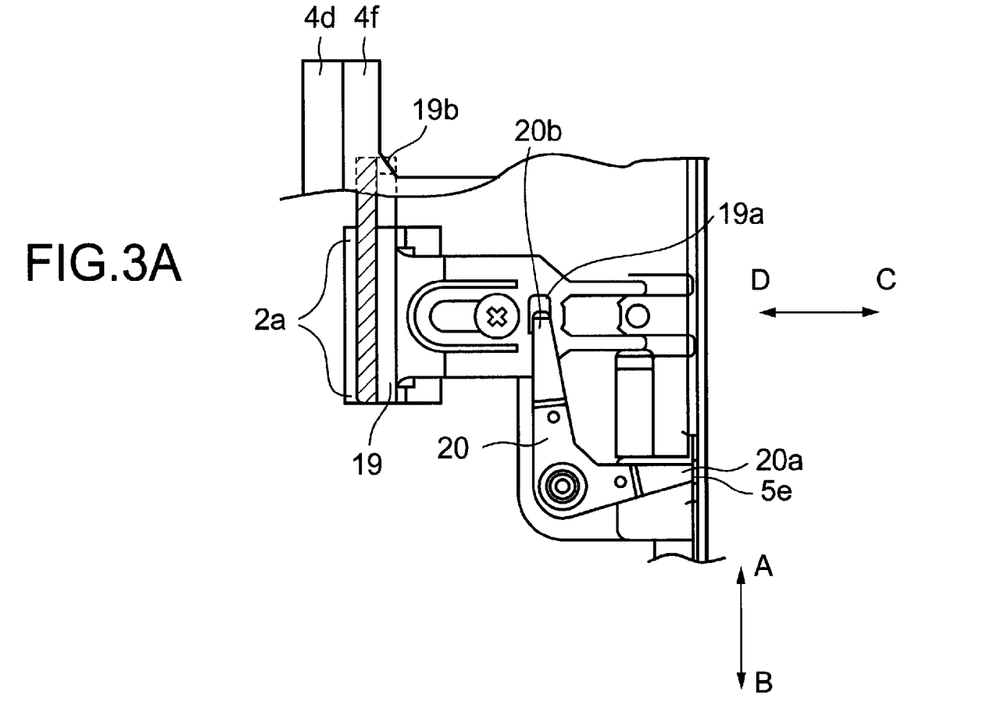
FIGS. 3A and 3B are respectively a partial plan view of the interior of a floppy disk drive unit and a partial side view thereof taken in the direction of the arrow II—II in the condition where a floppy disk is not yet installed in the embodiment.
Figure 3B:
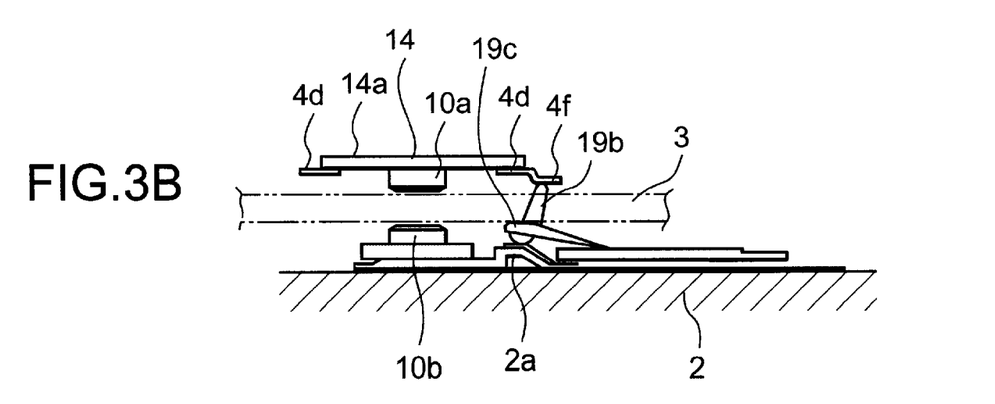

The floppy disk drive unit 1 includes a contact preventing element 19 (lifter) which is an integrally formed resin member having slidability and spring property for protecting the magnetic head 10b (FIG. 3B). The contact preventing element 19 has an engagement hole 19a engaged with a lifter arm mentioned later, a first stopper part 19b for inhibiting the downward movement of the cassette support 4 to prevent its contact with the magnetic head 10b, and a second stopper part 19c for inhibiting the downward movement of a floppy disk to prevent its contact with the magnetic head 10b (FIG. 2, FIGS. 3A, 3B). The first stopper part 19b is brought into contact with a first stopper contact part 4f of the cassette support 4 from below to support it when a floppy disk is not yet inserted. The second stopper part 19c is a support surface for supporting the lower surface of a floppy disk.

The upper magnetic head 10a is provided on a carriage 11 moved in the directions (the directions of the arrows A, B in FIG. 1) of inserting a floppy disk. The carriage 11 is moved in the directions of the arrows A, B by a lead screw 13 rotated by a stepping motor 12 to move the magnetic heads 10a, b to the read and write positions (hereinafter referred to as read/write position).

The upper magnetic head 10a is fitted to the lower surface of the holder 14. The holder 14 is fitted to the carriage 11 through a hinge (not shown), and energized downward (in the direction of the arrow F in FIG. 1) by the end part 15a of a load spring 15 fitted to the carriage 11. Arms 14a are respectively provided on both sides of the holder 14, and raised to a designated position by an arm contact part 4d of the cassette support 4 when a floppy disk is not yet inserted to keep constant the vertical space between the magnetic heads. A slide plate 5 is engaged with a guide part 6a of a mechanical base 6 through a guide hole 5b which is an elongated hole, and the slide plate 5 is moved only in the directions of the arrows A, B. The guide part 6a is a tongue-like projection formed by bending a part of the slide plate downward.

Further, referring to FIG. 1, the floppy disk drive unit 1 includes the slide plate (slider) 5 adapted to slide, interlocking with insertion of a floppy disk, a slide plate support 6 (hereinafter referred to as a mechanical base 6) for guiding the slide plate 5 in the direction of inserting or discharging a floppy disk 3 (hereinafter referred to as insert/discharge direction), a lifter arm 20 turned according to sliding of the slide plate 5, and a shield cover 7 for dustproof and internal protection.

The slide plate 5 includes an engagement part 5e (FIG. 1, FIG. 3A) pressed in engagement with the lifter arm 20, wherein when a floppy disk 3 is inserted, the cassette support 4 mentioned in the next paragraph is lowered, and the lifter arm 20 is turned clockwise, interlocking with such lowering, so that the contact preventing element 19 is lowered to be slid in the directions of the arrows C, D on the base 2.

The slide plate 5 is so constructed that a projecting part 5d (FIG. 1) where to install a button 16 is formed on the front end, and a cam sliding part 5a (FIGS. 1, 2B) is formed on the rear end. Springs 17, 18 are engaged with the slide plate 5 on the side apart from the button 16 and with the mechanical base 6 at the other end on the button 16 side (lower side).

The mechanical base 6 is arranged between the slide plate 5 and the shield cover 7, and screwed and fixed to the base 2. An inclined cam 5c (FIG. 1) is formed on both side edges of the slide plate 5 along the sliding direction, and engaged with a guide boss 4e provided on both side edges of the cassette support 4. The guide bosses 4e are engaged with vertical grooves 6b provided on both side edges of the mechanical base 6, thereby converting the movement in the directions of the arrows A, B of the slide plate 5 to the vertical movement through the inclined cams 5c.

The upper surface of the cassette support 4 is provided with a lock lever 8 for locking the slide plate 5 (FIG. 2B).

A coil spring 9 is guided by the boss 4a of the cassette support 4, one end thereof is fixed to a spring locking part 8a of the lock lever 8, and the other end thereof is fixed to a spring locking part 4b (FIG. 1) of the cassette support 4. The turning force in the direction of the arrow E (FIG. 2B) is applied to the lock lever 8 by the coil spring 9. An engagement lever 8b formed of resin material having good slidability is formed in the tip of the lock lever 8, and engaged with a medium shutter 3a of a floppy disk 3 when the floppy disk is inserted, whereby the force in the direction of the arrow D is applied to the medium shutter 3a, interlocking with the clockwise turning operation of the lock lever 8 to open the medium shutter 3a. In discharging a floppy disk, the floppy disk 3 is discharged by the turning force of the lock lever 8. The lock lever 8 has an engagement lever part 8b inserted in a groove 4c of the cassette support 4, and a hole 8c of the lock lever 8 is engaged with the boss 4a of the cassette support 4. A circular-arc cam part 8d centered about a hole 8c, which is made of resin material having good slidability, is formed at the end part on the opposite side to the engagement lever 8b of the lock lever 8. As shown in FIG. 2B, when a floppy disk is not yet inserted, the cam part 8d locks the cam sliding part 5a of the slide plate 5 to inhibit the slide plate 5 from conducting the sliding operation for moving in the direction of the arrow B.

Further, the floppy disk drive unit 1 includes a rotor 27 on which a recording medium in the floppy disk supported on the cassette support 4 is placed, wherein the turning force of a motor 22 is transmitted to the rotor 27 through a belt 23 to rotate the recording medium at a preset speed.

Further, the floppy disk drive unit 1 includes a bezel 24 having an opening part 24a in which a floppy disk 3 is inserted in front of the base 2 and the shield cover 7.

The operation of the embodiment of the present invention will now be described. The interior of the floppy disk drive unit 1 with a floppy disk not yet inserted is, as shown in FIGS. 2 and 3, so constructed that the slide plate 5 is put in a position shifted in the direction of the arrow A and locked by bringing a cam part 8d of the lock lever 8 into contact with the cam sliding part 5a (FIG. 2B). The holder 14 is located in an insert/discharge position for the floppy disk 3 by the arm contact part 4d of the cassette support 4 through an arm 14a. The contact preventing element 19 is forced to run onto the projecting part 2a of the base 2 by a lifter arm 20 and located in a designated position (FIGS. 3A, B).

When insertion of the floppy disk 3 from the opening part 24a is started, the floppy disk 3 is moved in the direction of the arrow A in the cassette support 4 and brought into contact with the engagement lever 8b provided on the lock lever 8. When the floppy disk 3 is further inserted in the interior, the floppy disk 3 is moved on support surface of the contact preventing element 9, that is, the second stopper part 19c not to be brought into contact with the magnetic head 10b (lower part).

The first stopper part 19b on the contact preventing element 19 supports the first stopper contact part 4f of the cassette support 4 from below. Accordingly, in the case where when a floppy disk is not yet inserted, an impact is applied from the outside, deflection of the cassette support 4 is restrained so that the height of the arm contact part 4d of the cassette support 4 will not change. Thus, the space between the magnetic heads 10a, b is kept constant to prevent the heads from colliding with each other to be broken.

Figure 4A:
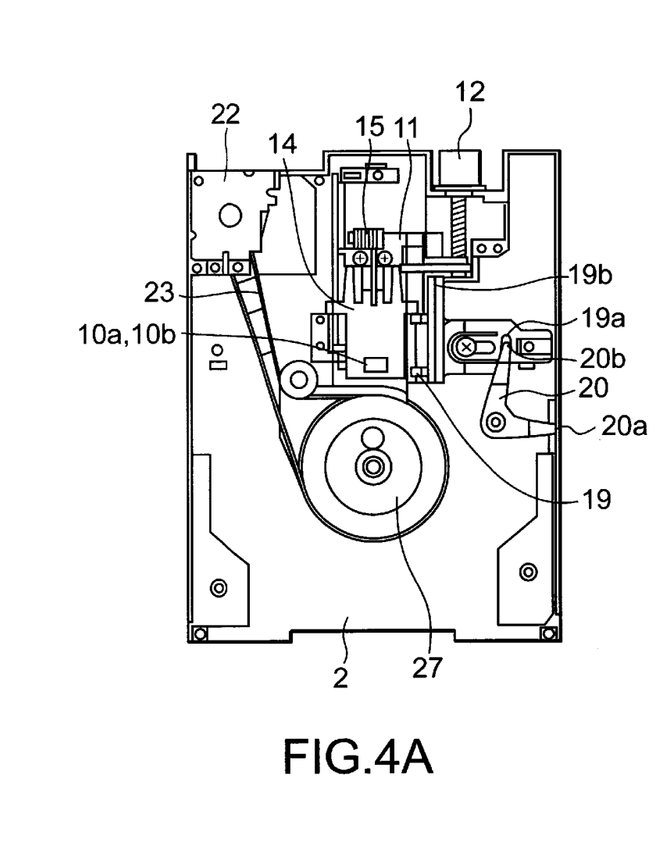
FIGS. 4A, 4B and 4C are respectively a plan view of the embodiment taken in the direction of the arrow I—I in the condition where a floppy disk is not yet installed; a plan view of a cassette support; and a side view of the base.
Figure 4B:
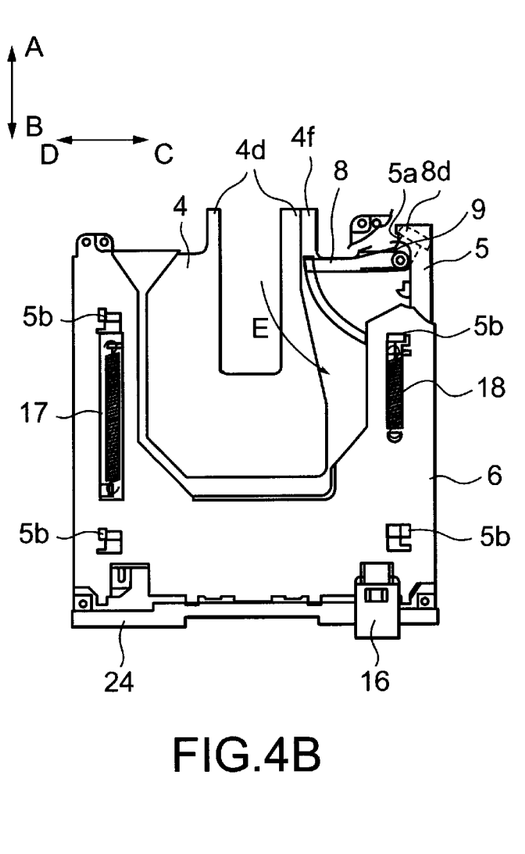
Figure 4C:
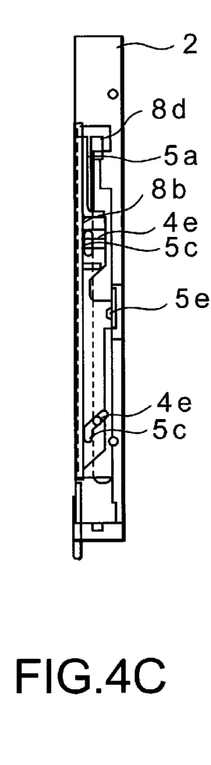
Figure 5A:
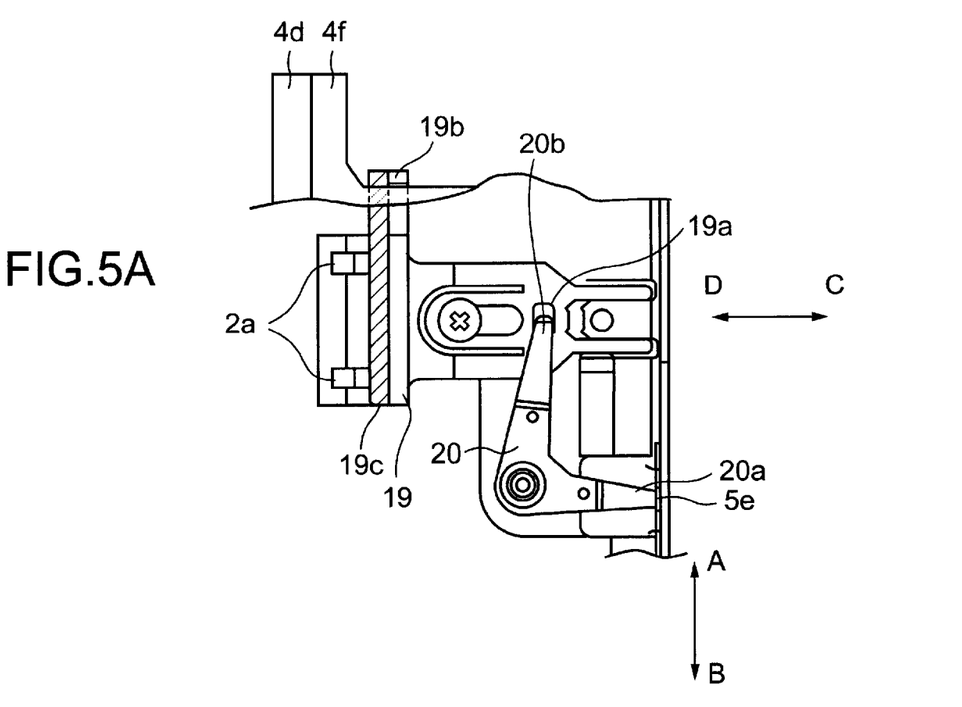
FIGS. 5A and 5B are a partial plan view of the interior of a floppy disk drive unit in the condition where a floppy disk is not yet installed in the embodiment and a partial side view thereof taken in the direction of the arrow II—II.
Figure 5B:
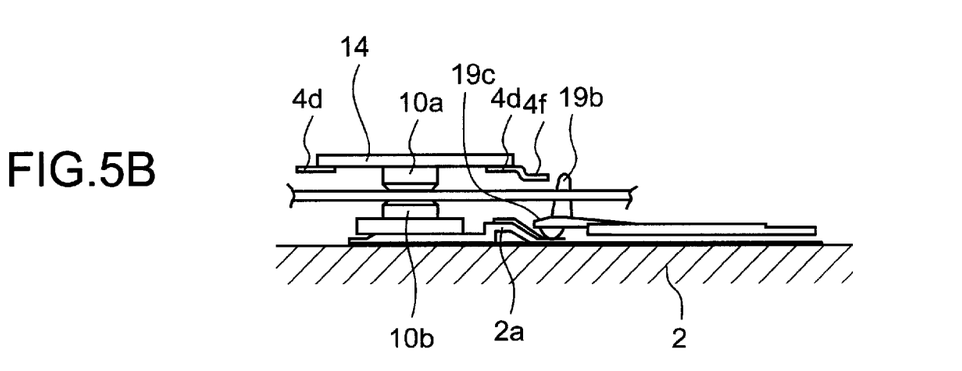
Figure 6A:
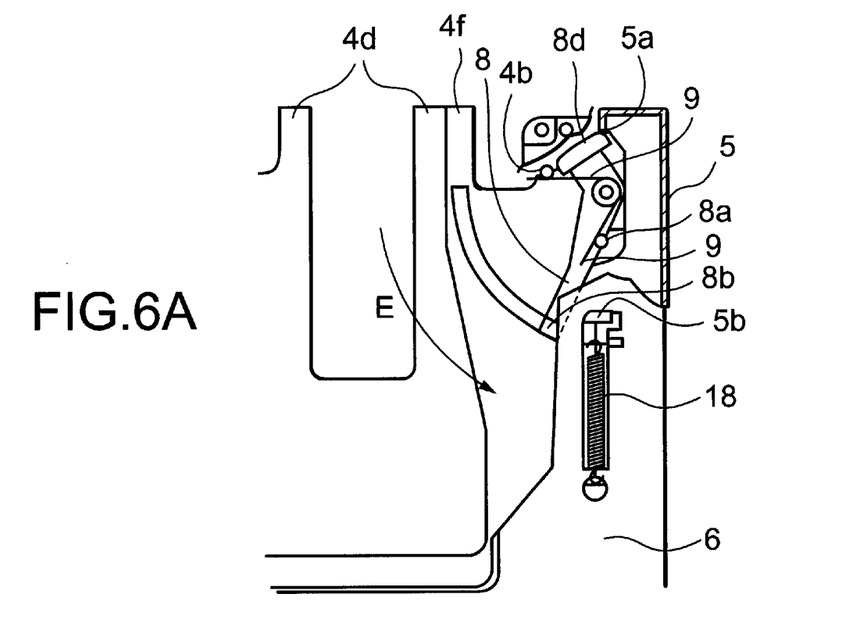
FIGS. 6A and 6B are partial enlarged views of FIG. 2B and FIG. 4B.
Figure 6B:
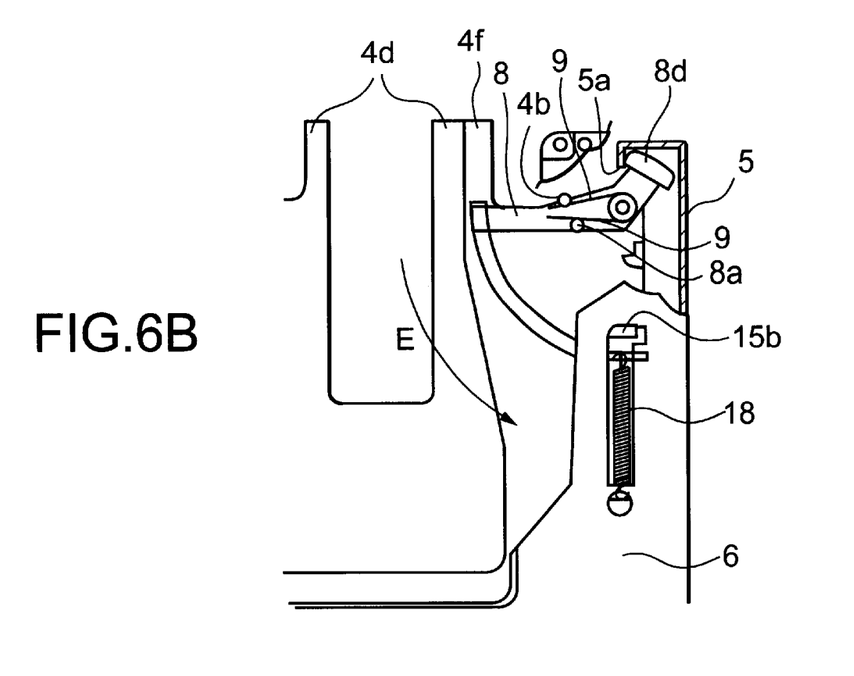

In the process of inserting the floppy disk 3, the lock lever 8 is turned clockwise, and the engagement lever 8b of the lock lever 8 is brought into contact with the medium shutter 3a to slide the medium shutter 3a in the opening direction (the direction of the arrow D). When the floppy disk 3 is further inserted, the cam part 8d of the lock lever 8 is separated from the engagement part 5a of the slide plate 5 to enter the interior of the slide plate 5 positioned on the right side of the cam engagement part 5a (FIG. 4B, FIG. 6B), thereby releasing locking of the slide plate 5 by the lock lever 8. FIGS. 6A and 6B are diagrams respectively showing the vicinity of the lock lever 8 in FIGS. 2B and 4B to an enlarged scale and also showing the interior of the slide plate 5. The slide plate 5 is slid in the direction of the arrow B by tensile force of springs 17, 18. As a result, the lifter arm 20 is turned clockwise, seen from above (FIG. 4), and the contact preventing element 19 is slid in the direction of the arrow C. Accordingly, the contact preventing element 19 is moved from the contact preventing position to the contact prevention release position before the cassette support 4 descends, so that the stopper part 19b will not obstruct the descending operation of the cassette support 4. When the slide plate 5 is moved in the direction of the arrow B simultaneously, the guide boss 4e is slid on the inclined cam 5c and moved downward. As a result, the cassette support 4 descends from the insert/discharge position to the read/write position while supporting the floppy disk 3 (FIG. 5), and the recording medium of the floppy disk 3 is placed on the rotor 27.

With the descent of the cassette support 4, the holder 14 descends. The rotor 27 is driven by a motor 22 through a belt 23 to rotate the recording medium, and read/write opration is performed by the magnetic heads 10a, 10b.

The floppy disk 3 is discharged by pushing the button 16 in the direction of the arrow A. That is, when the button 16 is pushed in the direction of the arrow A, the slide plate 5 guided by the mechanical base 6 is slid in the direction of the arrow A, and the cassette support 4 is raised to the insert/discharge position by the reverse operation to the insert operation to discharge the floppy disk 3.

In the present embodiment, even if external impact is applied to the floppy disk drive unit 1 in the condition where the floppy disk is not yet inserted, the magnetic heads are prevented from colliding with each other. Furthermore, as the first stopper part 19b of the cassette support 4 is formed integrally with the contact preventing element 19, it is not necessary to increase the number of parts.

According to the present invention, the floppy disk drive unit includes a contact preventing element having a first stopper part for inhibiting the downward movement of the support to prevent contact with the magnetic heads, and a second stopper part for inhibiting the downward movement of the floppy disk to prevent contact with the magnetic heads.

Thus, even if impact is applied from the outside to the floppy disk drive unit so that the support is bent and descended, the support is supported from below by the first stopper part so as to prevent the magnetic heads from being damaged.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A floppy disk drive unit for reading and writing information in a floppy disk by a magnetic head, comprising:
   said magnetic head with a sliding face up;
   a support for supporting a floppy disk opposite to said magnetic head;
   a housing for storing said magnetic head and said support;
   and a contact preventing element having a first stopper part for inhibiting downward movement of said support to prevent its contact with said magnetic head and a second stopper part for inhibiting downward movement of a floppy disk to prevent its contact with said magnetic head, said first stopper part being unified with said second stopper part as a single member.

2. The floppy disk drive unit according to claim 1, wherein said first stopper part is formed by a first projecting part formed on an extension part extended to a back part of the housing over an shutter edge position of a floppy disk supported on said support.

3. The floppy disk drive unit according to claim 2, wherein said floppy disk drive unit further includes a slider adapted to slide, interlocking with insertion of said floppy disk, and an arm adapted to turn according to the sliding operation of said slider,
   and said contact preventing element is slid from a contact preventing position to a contact prevention releasing position on an inner surface of said housing, interlocking with the turning of said arm.

4. The floppy disk drive unit according to claim 2, wherein said second stopper part is a support surface for supporting the lower surface of a floppy disk.

5. The floppy disk drive unit according to claim 4, wherein said floppy disk drive unit further includes a slider adapted to slide, interlocking with insertion of said floppy disk, and an arm adapted to turn according to the sliding operation of said slider,
   and said contact preventing element is slid from a contact preventing position to a contact prevention releasing position on an inner surface of said housing, interlocking with the turning of said arm.

6. The floppy disk drive unit according to claim 5, wherein said floppy disk drive unit further includes a second projecting part provided in the interior of said housing,
   and said contact preventing element is put on the second projecting part in the contact preventing position, and departs from said second projecting part in the contact preventing releasing position.

7. The floppy disk drive unit according to claim 6, wherein in inserting said floppy disk and supporting said floppy disk by said support, said support and said contact preventing element are interlocked with each other and descended.

8. The floppy disk drive unit according to claim 1, wherein said second stopper part is a support surface for supporting the lower surface of a floppy disk.

9. The floppy disk drive unit according to claim 8, wherein said floppy disk drive unit further includes a slider adapted to slide, interlocking with insertion of said floppy disk, and an arm adapted to turn according to the sliding operation of said slider,
   and said contact preventing element is slid from a contact preventing position to a contact prevention releasing position on a inner surface of said housing, interlocking with the turning of said arm.

10. The floppy disk drive unit according to claim 1,
wherein said floppy disk drive unit further includes a slider adapted to slide, interlocking with insertion of said floppy disk, and an arm adapted to turn according to the sliding operation of said slider, and said contact preventing element is slid from a contact preventing position to a contact prevention releasing position on an inner surface of said housing, interlocking with the turning of said arm.

11. The floppy disk drive unit of claim 1, wherein said contact preventing element, including said first and second stopper parts, is a single, integrally-formed resin member, and said first and second parts move in a fixed relationship to each other.

12. A floppy disk drive unit for reading and writing information in a floppy disk by a magnetic head, comprising:

a first magnetic head with a sliding face up; a support for supporting a floppy disk opposite to said magnetic head;

a housing for storing said first magnetic head and said support;

a holder which is connected to said housing and energized downward to be pressed to said support;

a second magnetic head fitted to a lower surface of said holder, with a sliding face down;

and a contact preventing element having a first stopper part for inhibiting downward movement of said support to prevent its contact with said first magnetic head and a second stopper part for inhibiting downward movement of a floppy disk to prevent its contact with said first magnetic head, said first stopper part and said second stopper part being a unified single member.

13. The floppy disk drive unit according to claim 12,
wherein said first stopper part is formed by a first projecting part formed on an extension part extended to a back part of the housing over a shutter edge position of a floppy disk supported on said support, and said second stopper part is a support surface for supporting a lower surface of said floppy disk.

14. The floppy disk drive unit according to claim 13,
wherein said floppy disk drive unit further includes a slider adapted to slide, interlocking with insertion of said floppy disk, and an arm adapted to turn according to the sliding operation of said slider, and said contact preventing element is slid from a contact preventing position to the contact prevention releasing position on a inner surface of said housing, interlocking with the turning of said arm.

15. The floppy disk drive unit according to claim 14,
wherein said floppy disk drive unit further includes a second projecting part provided in the interior of said housing, and said contact preventing element is put on the second projecting part in the contact preventing position, and departs from said second projecting part in the contact prevention releasing position.

16. The floppy disk drive unit according to claim 15,
wherein in inserting said floppy disk and supporting said floppy disk by said support, said support and said contact preventing element are interlocked with each other and descended.

17. The floppy disk drive unit of claim 12, wherein said contact preventing element, including said first and second stopper parts, is a single, integrally-formed resin member, and said first and second parts move in a fixed relationship to each other.

* * * * *